US012608984B2

(12) United States Patent
Hamano

(10) Patent No.: US 12,608,984 B2
(45) Date of Patent: Apr. 21, 2026

(54) INFORMATION COLLECTION SYSTEM AND INFORMATION COLLECTION METHOD

(71) Applicant: HONDA MOTOR CO., LTD., Tokyo (JP)

(72) Inventor: Yusuke Hamano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 18/392,727

(22) Filed: Dec. 21, 2023

(65) Prior Publication Data

US 2024/0249563 A1 Jul. 25, 2024

(30) Foreign Application Priority Data

Jan. 23, 2023 (JP) ................................ 2023-008232

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC .............................. G07C 5/008; G07C 5/0808
USPC ......................................................... 701/31.4
See application file for complete search history.

(56) References Cited

U.S. PATENT DOCUMENTS 9,745,942 B2 * 8/2017 Flick .................. F02N 11/0807
2015/0073685 A1 * 3/2015 Choi .................. F02N 11/0807 701/113
2015/0217626 A1 * 8/2015 Minami ............ B60H 1/00657 165/11.1
2018/0148008 A1 * 5/2018 Gage ..................... B60R 25/209
2019/0176752 A1 * 6/2019 Cermak .............. H04L 12/2814
2024/0249563 A1 * 7/2024 Hamano .............. G07C 5/0808
2024/0392612 A1 * 11/2024 Van Wiemeersch .... B60R 25/23

FOREIGN PATENT DOCUMENTS

JP 2017-091234 A 5/2017
JP 2019095138 A * 6/2019

* cited by examiner

*Primary Examiner* — Tyler D Paige
(74) *Attorney, Agent, or Firm* — Rankin, Hill & Clark LLP

(57) ABSTRACT

An information collection system includes: a communication control unit configured to communicate with a plurality of moving bodies; a target function setting unit configured to set any of functions provided in the moving body as a target function to acquire information; a target use condition setting unit configured to set a target use condition that is a use condition of the moving body, the use condition under which the target function being assumed to operate frequently; a target moving body extraction unit configured to extract a target moving body, which is the moving body that has the target function and is being used under the target use condition; and a monitor information acquisition unit configured to receive and acquire monitor information regarding an operation of the target function from the target moving body by communicating with the target moving body.

6 Claims, 4 Drawing Sheets

FIG.2

22

| VEHICLE CODE | USER INFORMATION | VEHICLE FUNCTION INFORMATION | VEHICLE USE CONDITION INFORMATION |
|---|---|---|---|
| Cc-001 | Ui-001 | Cf-001 | Cu-001 |
| Cc-002 | Ui-002 | Cf-002 | Cu-002 |
| Cc-003 | Ui-003 | Cf-003 | Cu-003 |
| : | : | : | : |

Cri

FIG.3

24

| VEHICLE FUNCTION | USE CONDITION |
|---|---|
| REMOTE ENGINE START | COLD REGION, SUMMER PERIOD, WINTER PERIOD |
| AIR CONDITIONING OF VEHICLE INTERIOR | COLD REGION, SUMMER PERIOD, WINTER PERIOD |
| LANE DEVIATION PREVENTION | HIGH TRAVEL FREQUENCY OF EXPRESSWAY |
| : | : |

INFORMATION COLLECTION SYSTEM AND INFORMATION COLLECTION METHOD

INCORPORATION BY REFERENCE

The present application claims priority under 35 U.S.C. § 119 to Japanese Patent Application No. 2023-008232 filed on Jan. 23, 2023. The content of the application is incorporated herein by reference in its entirety.

BACKGROUND OF THE INVENTION

Field of the Invention

The present invention relates to an information collection system and an information collection method.

Description of the Related Art

Conventionally, a system which receives and collects various kinds of information transmitted from vehicles with many vehicles as targets has been known (for example, see Japanese Patent Laid-Open No. 2017-91234). Japanese Patent Laid-Open No. 2017-91234 discloses a configuration which reduces a transmission amount of information as the configuration of determining presence/absence of abnormality of a program used in a vehicle controller, transmitting a diagnosis result indicating the abnormality to a system when the diagnosis result indicates the abnormality and not transmitting anything when the diagnosis result indicates normality.

Various kinds of information regarding vehicles can be collected by communication with the vehicles as in the system of the related art described above, however, the kind and amount of the information that can be collected from each vehicle is different depending on a use situation of each vehicle. Therefore, it is inconvenient that there are cases where useless communication is performed with a vehicle from which required information cannot be obtained and efficiency of information collection declines, when a communicable vehicle is randomly extracted and information is collected from the vehicle.

The present application is implemented in consideration of such a background, and it is an object to provide an information collection system and an information collection method capable of suppressing a communication amount with moving bodies such as vehicles and efficiently collecting information regarding the moving bodies.

SUMMARY OF THE INVENTION

A first aspect for achieving the object described above is an information collection system including: a communication control unit configured to communicate with a plurality of moving bodies; a target function setting unit configured to set any of functions provided in the moving body as a target function to acquire information; a target use condition setting unit configured to set a target use condition that is a use condition of the moving body, the use condition under which the target function being assumed to operate frequently; a target moving body extraction unit configured to extract from the plurality of moving bodies a target moving body, which is the moving body that has the target function and is being used under the target use condition; and a monitor information acquisition unit configured to receive and acquire monitor information regarding an operation of the target function from the target moving body by communicating with the target moving body by the communication control unit.

The information collection system described above may be configured such that the communication control unit communicates with a terminal device which transmits collection request information of the monitor information, and the target function setting unit sets the function specified as a target of information collection as the target function by the collection request information received and acquired from the terminal device by communicating with the terminal device by the communication control unit.

The information collection system described above may be configured such that the monitor information includes detection information of a sensor provided in the moving body in order to detect an operation situation of the target function.

The information collection system described above may be configured such that the target use condition setting unit sets, as the target use condition, that the moving body is being used in a predetermined region, or that the moving body is being used in a predetermined period.

The information collection system described above may be configured such that the target use condition setting unit sets, as the target use condition, that the moving body is being used in a cold region, or that the moving body is being used in a winter period or a summer period, when the target function is a remote control function of the moving body.

A second aspect for achieving the object described above is an information collection method executed by a computer, and the information collection method includes: a communication control step of communicating with a plurality of moving bodies; a target function setting step of setting any of functions provided in the moving body as a target function to acquire information; a target use condition setting step of setting a target use condition that is a use condition of the moving body, the use condition under which the target function being assumed to operate frequently; a target moving body extraction step of extracting from the plurality of moving bodies a target moving body, which is the moving body that has the target function and is being used under the target use condition; and a monitor information acquisition step of receiving and acquiring monitor information regarding an operation of the target function from the target moving body by communicating with the target moving body by the communication control step.

According to the information collection system described above, information regarding moving bodies can be efficiently collected while suppressing a communication amount with the moving bodies.

BRIEF DESCRIPTION OF THE DRAWINGS

FIG. 2 is an explanatory drawing of a vehicle registration database;

FIG. 3 is an explanatory drawing of a use condition map; and

DETAILED DESCRIPTION OF THE PREFERRED EMBODIMENTS

Figure 1:
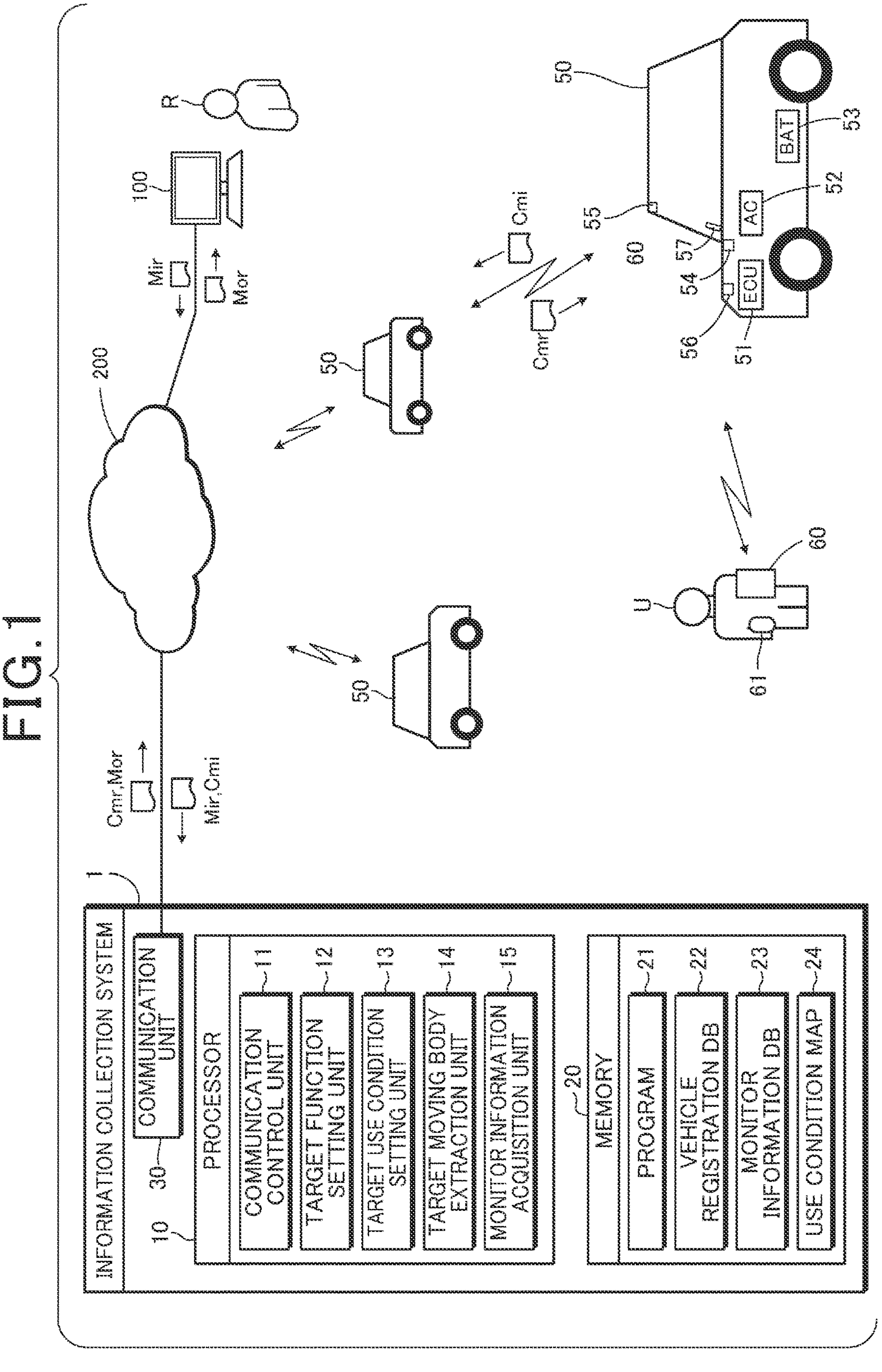
FIG. 1 is an explanatory drawing of a configuration of an information collection system and an aspect of information collection from vehicles by the information collection system.

1. Aspect of Information Collection from Vehicles by Information Collection System With reference to FIG. 1 to FIG. 3, the aspect of information collection from a plurality of vehicles 50 executed by an information collection system 1 of the present embodiment will be explained. The vehicle 50 corresponds to a moving body of the present disclosure. The information collection system 1 communicates with the plurality of vehicles 50, a portable terminal 60 used by a user U of the vehicle 50, and a terminal device 100 used by a requester R requesting collection and provision of information from the vehicle 50, via a communication network 200. The portable terminal 60 is, for example, a smartphone, a portable phone and a tablet terminal. The terminal device 100 may be a portable terminal or may be a fixed terminal such as a personal computer.

Each vehicle 50 includes an ECU (Electronic Control Unit) 51 which controls an operation of the vehicle 50, an air conditioner 52, a battery 53, various kinds of sensors 54, a camera 55 which photographs surroundings of the vehicle 50, a communication unit 56 and a display device 57 such as a touch panel. The sensors 54 include various kinds of sensors for detecting a state of the vehicle 50, such as a GNSS (Global Navigation Satellite System) sensor which detects a current position of the vehicle 50, a speed sensor, an acceleration sensor, an indoor temperature sensor, a battery sensor and an operation sensor which detects the operation of actuators provided in the vehicle 50.

The ECU 51 communicates with the information collection system 1 via the communication network 200 by the communication unit 56, and also communicates with the portable terminal 60 and a portable key 61 (such as a smart key and an FOB key) used by the user U of the vehicle 50.

By receiving remote control information transmitted from the portable terminal 60 or the portable key 61 by the communication unit 56, the ECU 51 accepts an instruction for a start (remote engine start) of an engine provided in the vehicle 50 and air conditioning of a vehicle interior by the air conditioner 52, and executes control of a remote control function which starts the engine and operates the air conditioner 52. Further, the ECU 51 executes the control of a driving assist function which assists a driving operation of the vehicle 50 by the user U, based on a situation around the vehicle 50 recognized from a photographed image of the camera 55. The driving assist function is, for example, a function of a collision damage reduction brake, ACC (Adaptive Cruise Control), lane deviation prevention (lane keep assist), false start suppression, headlight support and parking assist.

The information collection system 1 is a computer system including a processor 10, a memory 20, and a communication unit 30 or the like. In the memory 20, a program 21 for control of the information collection system 1, a vehicle registration DB (database) 22, a monitor information DB 23, and data of a use condition map 24 are preserved.

As illustrated in FIG. 2, in the vehicle registration DB 22, vehicle registration information Cri including a vehicle code (Cc-001, Cc-002, . . . ), user information (Ui-001, Ui-002, . . . ), vehicle function information (Cf-001, Cf-002, . . . ) and vehicle use condition information (Cu-001, Cu-002, . . . ) is recorded for each vehicle 50.

The vehicle code is identification information intrinsically allocated to each vehicle 50. The user information includes a registration ID (identification), a name, an address and contact information (such as a telephone number and a communication address of a portable terminal) or the like of a user of each vehicle. The vehicle function information is the information regarding the functions (such as the remote control function and the driving assist function described above) provided in each vehicle 50.

The vehicle use condition information is the information regarding a use condition of each vehicle 50. The use condition is a region (such as a cold region and a warm region) where the vehicle 50 is being used, and the information of a road where the vehicle 50 frequently travels (such as a travel frequency of an expressway, a travel frequency of an urban road and a travel frequency of a mountain road) or the like. The region where the vehicle 50 is being used and the information of the road where the vehicle 50 has traveled are detected by the GNSS sensor of the vehicle 50, recognized based on position information of the vehicle 50 transmitted from the vehicle 50, and are registered in the vehicle registration DB 22, or are recorded in the vehicle registration DB 22 by information provision from the user U of the vehicle 50.

As illustrated in FIG. 3, the use condition map 24 is an example of a map in which each function provided in the vehicle 50 and use conditions under which each function is assumed to operate frequently are made to correspond. In FIG. 3, to the function of the remote engine start, a cold region which is a region where it is assumed that the start of a drive source such as an engine and an operation start of the air conditioner 52 linked with the start of the drive source are frequently instructed, and a summer period and a winter period which are the periods during which it is assumed that the instruction described above is frequently performed are made to correspond. To the function of the air conditioning of the vehicle interior, similarly, the use conditions of the cold region, the summer period and the winter period are made to correspond. In addition, to the function of the lane deviation prevention, the use condition that the travel frequency of the expressway is high is made to correspond.

The information collection system 1 accepts a provision request for monitor information regarding the operation of a target function which is any of the functions provided in the vehicle 50 by receiving collection request information Mir transmitted from the terminal device 100 according to the operation by the requester R. Then, the information collection system 1 refers to the use condition map 24, and sets the use condition corresponding to the target function specified by the collection request information Mir, as a target use condition which is an extraction condition of the vehicle 50 to be an acquisition target of the monitor information, by the use condition map 24.

When the target use condition is a use region or the like recorded in the vehicle registration DB 22, the information collection system 1 refers to the vehicle registration DB 22 and extracts the vehicle 50 (hereinafter, called a target vehicle 50) which has the target function and is being used under the target use condition. In addition, when the target use condition is a predetermined period such as the winter period, the information collection system 1 extracts the vehicle 50 which has the target function and is being used in the predetermined period as the target vehicle 50.

To the target vehicle 50 extracted in such a manner, the information collection system 1 transmits transmission request information Cmr requesting transmission of monitor information Cmi regarding the operation of the target function. The monitor information Cmi includes date and time when the target function is operated, a period of time during which the target function is operated and detection information of the sensors 54 when the target function is operated. For example, when the target function is the driving assist function, the monitor information Cmi includes the information of a speed, acceleration and a position (travel spot) or the like of the target vehicle 50 detected by the sensors when the driving assist function is operated.

The information collection system 1 receives and acquires the monitor information Cmi transmitted from the target vehicle 50 in response to reception of the transmission request information Cmr, and preserves the monitor information Cmi in the monitor information DB 23. The information collection system 1 transmits monitor report information Mor for which the monitor information Cmi acquired from the target vehicle 50 is organized to the terminal device 100 of the requester R.

In this way, by communicating only with the target vehicle 50 satisfying the target use condition under which it is assumed that the target function is frequently operated and acquiring the monitor information Cmi, communication with the vehicle 50 in which the target function is not frequently operated is avoided and the monitor information Cmi can be efficiently collected.

2. Configuration of Information Collection System

With reference to FIG. 1, the processor 10 of the information collection system 1 functions as a communication control unit 11, a target function setting unit 12, a target use condition setting unit 13, a target moving body extraction unit 14, and a monitor information acquisition unit 15, by reading and executing the program 21 preserved in the memory 20.

Processing executed by the communication control unit 11 corresponds to a communication control step in an information collection method of the present disclosure, and processing executed by the target function setting unit 12 corresponds to a target function setting step in the information collection method of the present disclosure. Processing executed by the target use condition setting unit 13 corresponds to a target use condition setting step in the information collection method of the present disclosure, and processing executed by the target moving body extraction unit 14 corresponds to a target moving body extraction step in the information collection method of the present disclosure. Processing executed by the monitor information acquisition unit 15 corresponds to a monitor information acquisition step in the information collection method of the present disclosure.

The communication control unit 11 controls the communication by the communication unit 30 via the communication network 200 with the plurality of vehicles 50 registered in the vehicle registration DB 22, the terminal device 100 used by the requester R of the provision of the monitor information Cmi, and the portable terminal 60 used by the user U of the vehicle 50. The communication between the information collection system 1 and the vehicle 50 and the terminal device 100 explained below is executed via the communication unit 30 and the communication control unit 11.

The target function setting unit 12 receives the collection request information Mir transmitted from the terminal device 100 and accepts a provision request for the monitor information regarding the operation of the function provided in the vehicle 50. The target function setting unit 12 sets the function specified as the target of an information collection request by the collection request information Mir as the target function.

The target use condition setting unit 13 refers to the use condition map 24 and sets the use condition corresponding to the target function as the target use condition for extracting the vehicle 50 to acquire the monitor information Cmi regarding the operation of the target function. The target moving body extraction unit 14 refers to the vehicle registration DB 22, and extracts the vehicle 50 which has the target function and is being used under the target use condition as the target vehicle 50 from the vehicles 50 registered in the vehicle registration DB 22.

The monitor information acquisition unit 15 transmits the transmission request information Cmr requesting the transmission of the monitor information Cmi regarding the operation of the target function to the target vehicle 50, and receives and acquires the monitor information Cmi transmitted from the vehicle 50. The monitor information acquisition unit 15 generates the monitor report information Mor for which the monitor information Cmi acquired from the target vehicle 50 is organized, and transmits the monitor report information Mor to the terminal device 100.

3. Collection Processing of Monitor Information

According to the flowchart illustrated in FIG. 4, a series of procedures of the collection processing of the monitor information Cmi regarding the operation of the target function of the vehicle 50 executed by the information collection system 1 will be explained.

Figure 4:
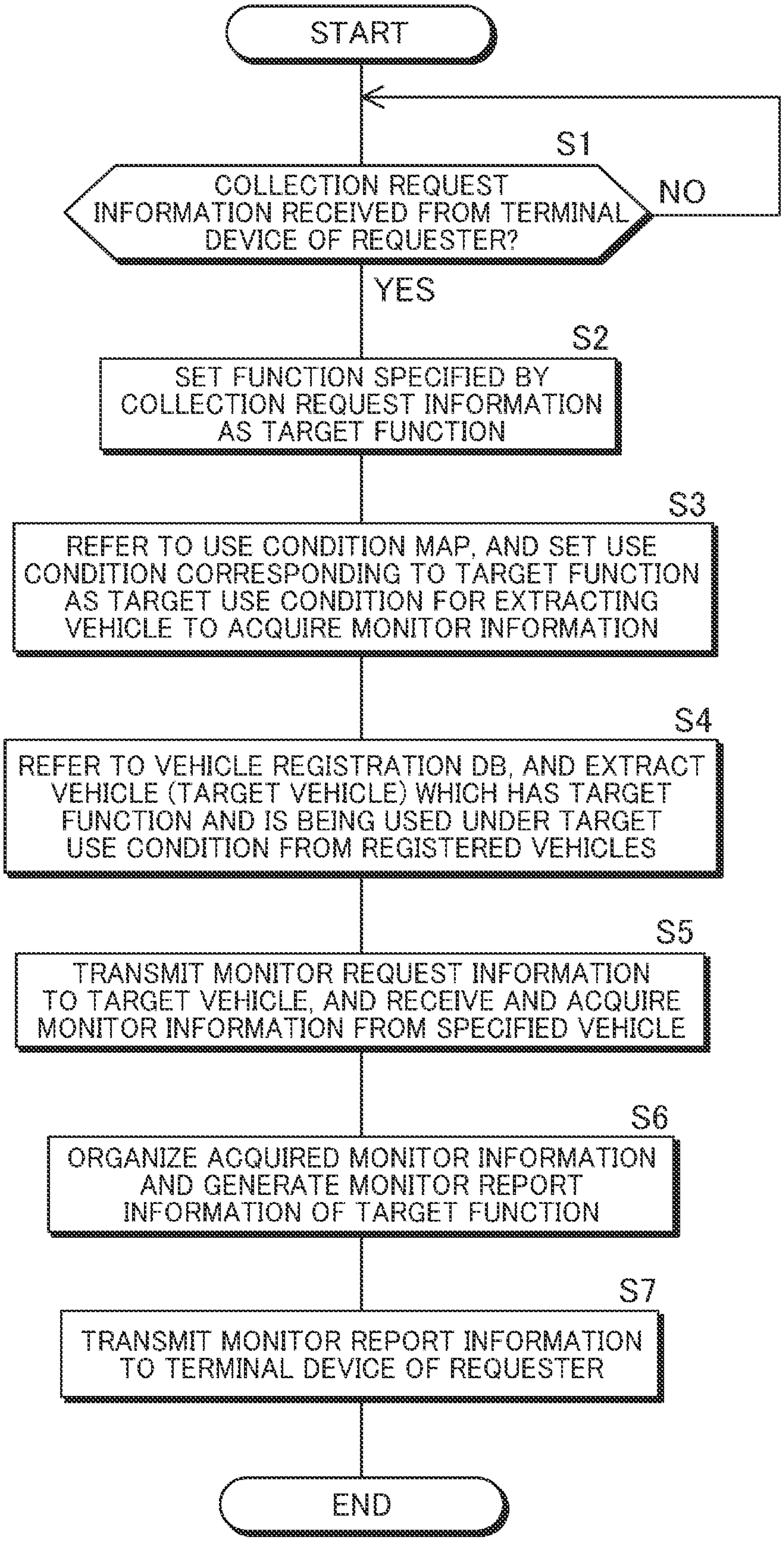
FIG. 4 is a flowchart of monitor information collection processing.

In step S1 in FIG. 4, the target function setting unit 12 advances the processing to step S2 when the collection request information Mir transmitted from the terminal device 100 is received. In step S2, the target function setting unit 12 sets the function which is the target of the information collection specified by the collection request information Mir as the target function.

In next step S3, the target use condition setting unit 13 refers to the use condition map 24, and sets the use condition corresponding to the target function as the target use condition for extracting the monitor information regarding the operation of the target function. In following step S4, the target moving body extraction unit 14 refers to the vehicle registration DB 22, and extracts the target vehicle 50 which has the target function and is being used under the target use condition from the vehicles 50 registered in the vehicle registration DB 22.

In next step S5, the monitor information acquisition unit 15 transmits the transmission request information Cmr requesting the transmission of the monitor information regarding the operation of the target function to the target vehicle 50, and receives and acquires the monitor information Cmi transmitted from the target vehicle 50. In following step S6, the monitor information acquisition unit 15 organizes two or more pieces of the acquired monitor information Cmi and generates the monitor report information Mor indicating an operation situation of the target function.

In next step S7, the monitor information acquisition unit 15 transmits the monitor report information Mor to the terminal device 100 of the requester R. The requester R can browse the monitor report information Mor and perform analysis of the operation situation of the target function or the like by the terminal device 100.

4. Other Embodiments

The embodiment described above illustrates the vehicle as the moving body of the present disclosure, however, the moving body of the present disclosure is the moving body having the target function to be the target of the information collection of the operation situation, and the moving body of the present disclosure may be an aircraft or a ship or the like.

In the embodiment described above, as the use condition when extracting a specified vehicle to acquire the monitor information, the region where the vehicle is being used, the period during which the vehicle is being used and a use frequency of the vehicle on an expressway are exemplified in FIG. 4. As another embodiment, for example, when the target function is a false start prevention function, it may be set as the use condition that the user of the vehicle is an elderly person.

Note that FIG. 1 is a schematic drawing in which a functional configuration of the information collection system 1 is divided according to main processing contents and illustrated in order to facilitate understanding of the invention of the present disclosure, and the configuration of the information collection system 1 may be configured by other divisions. In addition, the processing of each component may be executed by one hardware unit or may be executed by a plurality of hardware units.

Further, the processing of each component illustrated in FIG. 4 may be executed by one program or may be executed by a plurality of programs.

5. Configurations Supported by Embodiment Described Above

The embodiment described above is a specific example of the following configurations.

(Configuration 1) An information collection system including: a communication control unit configured to communicate with a plurality of moving bodies; a target function setting unit configured to set any of functions provided in the moving body as a target function to acquire information; a use condition setting unit configured to set a use condition of the moving body, under which it is assumed that the target function is frequently operated; a target moving body extraction unit configured to extract from the plurality of moving bodies a target moving body, which is the moving body that has the target function and is being used under the use condition; and a monitor information acquisition unit configured to receive and acquire monitor information regarding an operation of the target function from the target moving body by communicating with the target moving body by the communication control unit.

According to the information collection system of configuration 1, by extracting the target moving body used under the use condition under which it is assumed that the target function is frequently operated and acquiring the monitor information regarding the operation of the target function from the target moving body, the information regarding the moving body can be efficiently collected while suppressing the communication amount with the moving body.

(Configuration 2) The information collection system according to configuration 1, wherein the communication control unit communicates with a terminal device which transmits collection request information of the monitor information, and the target function setting unit sets the function specified as a target of information collection as the target function by the collection request information received and acquired from the terminal device by communicating with the terminal device by the communication control unit.

According to the information collection system of configuration 2, a requester of the information provision can specify the function to be a collection target of the monitor information from the plurality of functions provided in the moving body by the collection request information.

(Configuration 3) The information collection system according to configuration 1 or configuration 2, wherein the monitor information includes detection information of a sensor provided in the moving body in order to detect an operation situation of the target function.

According to the information collection system of configuration 3, the detection information of the sensor that can be utilized for the analysis of the operation situation of the target function or the like can be collected.

(Configuration 4) The information collection system according to any one of configuration 1 to configuration 3, wherein the use condition setting unit sets, as the use condition, that the moving body is being used in a predetermined region, or that the moving body is being used in a predetermined period.

According to the information collection system of configuration 4, the use condition under which the target function is frequently operated can be set based on a difference of use environments for every region such as a cold region and a warm region and a difference of air temperatures depending on seasons for example.

(Configuration 5) The information collection system according to configuration 4, wherein the use condition setting unit sets, as the use condition, that the moving body is being used in a cold region, or that the moving body is being used in a winter period or a summer period, when the target function is a remote control function of the moving body.

According to the information collection system of configuration 5, the use in the cold region where it is assumed that the operation of the operation start or the like of the air conditioner provided in the moving body is frequently performed, the use in the winter period during which it is assumed that the operation of a heating start by the air conditioner is frequently performed, or the use in the summer period during which it is assumed that the operation of a cooling start by the air conditioner is frequently performed, by the remote control function, can be set as the use condition.

(Configuration 6) An information collection method executed by a computer, the information collection method including: a communication control step of communicating with a plurality of moving bodies; a target function setting step of setting any of functions provided in the moving body as a target function to acquire information; a use condition setting step of setting a use condition of the moving body, the use condition under which the target function being assumed to operate frequently; a target moving body extraction step of extracting from the plurality of moving bodies a target moving body, which is the moving body that has the target function and is being used under the use condition; and a monitor information acquisition step of receiving and acquiring monitor information regarding an operation of the target function from the target moving body by communicating with the target moving body by the communication control step.

By executing the information collection method of configuration 6 by the computer, effects similar to that of the information collection system of configuration 1 can be obtained.

1 . . . information collection system, 10 . . . processor, 11 . . . communication control unit, 12 . . . target function setting unit, 13 . . . target use condition setting unit, 14 . . . target moving body extraction unit, 15 . . . monitor information acquisition unit, 20 . . . memory, 21 . . . program, 22 . . . vehicle registration DB, 23 . . . monitor information DB, 24 . . . use condition map, 30 . . . communication unit, 50 . . . vehicle (moving body), 51 . . . ECU, 52 . . . air conditioner, 53 . . . battery, 54 . . . sensors, 55 . . . camera, 56 . . . communication unit, 57 . . . display device, 60 . . . (user's) portable terminal, 61 . . . portable key, 100 . . . (requester's) terminal device, 200 . . . communication network, R . . . requester, U . . . user.

What is claimed is:

1. An information collection system comprising a processor and a memory, wherein the processor is configured to:

communicate with a plurality of moving bodies via a network;

set any of functions provided in the moving body as a target function to acquire monitor information regarding an operation of the target function;

set, referring to a use condition map, in which each function provided in the moving body and use conditions under which each function is operated are made to correspond, stored in the memory in advance, the use condition associated with the target function as a target use condition that is an extraction condition of the moving body from which the monitor information is acquired;

extract from the plurality of moving bodies a target moving body, which is the moving body that has the target function and is being used under the target use condition by referring to function information which is information regarding functions provided in each of the plurality of moving bodies and which is recorded in the memory for each of the plurality of moving bodies, and use condition information which is information regarding a region and a road where the moving body is used; and receive and acquire the monitor information regarding the operation of the target function from the target moving body by communicating with the target moving body.

2. The information collection system according to claim 1, wherein the processor communicates with a terminal device which transmits collection request information of the monitor information, and sets the function specified as a target of information collection as the target function by the collection request information received and acquired from the terminal device by communicating with the terminal device.

3. The information collection system according to claim 1, wherein the monitor information includes detection information of a sensor provided in the moving body in order to detect an operation situation of the target function.

4. The information collection system according to claim 1, wherein the processor sets, as the target use condition, that the moving body is being used in a predetermined region, or that the moving body is being used in a predetermined period.

5. The information collection system according to claim 4, wherein the processor sets, as the target use condition, that the moving body is being used in a cold region, or that the moving body is being used in a winter period or a summer period, when the target function is a remote control function of the moving body.

6. An information collection method executed by a computer, the information collection method comprising:

a communication control step of communicating with a plurality of moving bodies via a communication network;

a target function setting step of setting any of functions provided in the moving body as a target function to acquire monitor information regarding an operation of the target function;

a target use condition setting step of setting, referring to a use condition map, in which each function provided in the moving body and use conditions under which each function is operated are made to correspond, stored in a memory of the computer in advance, the use condition associated with the target function as a target use condition that is an extraction condition of the moving body from which the monitor information is acquired;

a target moving body extraction step of extracting from the plurality of moving bodies a target moving body, which is the moving body that has the target function and is being used under the target use condition by referring to function information which is information regarding functions provided in each of the plurality of moving bodies and which is recorded in the memory for each of the plurality of moving bodies, and use condition information which is information regarding a region and a road where the moving body is used; and a monitor information acquisition step of receiving and acquiring the monitor information regarding the operation of the target function from the target moving body by communicating with the target moving body by the communication control step.

* * * * *